(12) United States Patent
Taniguchi et al.

(10) Patent No.: US 6,803,747 B2
(45) Date of Patent: Oct. 12, 2004

(54) INTERNAL COMBUSTION DRIVEN AUTOMOTIVE ALTERNATOR HAVING INERTIAL TORQUE CHANGE CONTROL CIRCUIT

(75) Inventors: Makoto Taniguchi, Kariya (JP);
Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 55 days.

(21) Appl. No.: 10/301,571

(22) Filed: Nov. 22, 2002

(65) Prior Publication Data
US 2003/0107351 A1 Jun. 12, 2003

(30) Foreign Application Priority Data
Dec. 6, 2001 (JP) ........................................ 2001-373237

(51) Int. Cl.[7] ............................. H02P 9/14; H02P 9/44
(52) U.S. Cl. .......................................... 322/28; 322/36
(58) Field of Search ............................. 322/17, 28, 36, 322/44, 49, 59, 86

(56) References Cited

U.S. PATENT DOCUMENTS

| | | | | |
|---|---|---|---|---|
| 4,115,729 A | * | 9/1978 | Young et al. ................ 322/86 |
| 4,258,307 A | * | 3/1981 | Mori et al. .................. 322/28 |
| 4,454,465 A | * | 6/1984 | Greene ....................... 322/49 |
| 4,509,091 A | * | 4/1985 | Booth ........................ 361/154 |
| 4,599,552 A | * | 7/1986 | Phillips et al. ............... 322/28 |
| 4,616,162 A | * | 10/1986 | Radomski .................. 388/822 |
| 4,653,601 A | * | 3/1987 | Nakamura et al. ......... 180/446 |
| 4,663,581 A | * | 5/1987 | Glennon ..................... 322/52 |
| 4,725,259 A | | 2/1988 | Miyata ....................... 474/70 |
| RE33,140 E | * | 1/1990 | Booth ........................ 361/154 |
| 5,061,889 A | * | 10/1991 | Iwatani et al. .............. 322/28 |
| 5,153,498 A | * | 10/1992 | Parro ......................... 322/25 |
| 5,266,836 A | * | 11/1993 | Sousa ......................... 290/31 |
| 5,325,043 A | * | 6/1994 | Parro ......................... 322/23 |
| 5,327,061 A | * | 7/1994 | Gullapalli .................. 318/649 |
| 5,373,196 A | * | 12/1994 | Faley ......................... 307/46 |
| 5,376,876 A | * | 12/1994 | Bauser et al. ............... 322/28 |
| 5,497,870 A | * | 3/1996 | Takashi .................. 192/84.96 |
| 5,563,497 A | * | 10/1996 | Iwatani et al. .............. 322/99 |
| 5,602,470 A | * | 2/1997 | Kohl et al. ................. 324/177 |
| 5,731,690 A | * | 3/1998 | Taniquchi et al. ............ 322/28 |
| 5,920,395 A | * | 7/1999 | Schulz ...................... 356/622 |
| 6,175,217 B1 | * | 1/2001 | Da Ponte et al. ............ 322/19 |
| 6,346,797 B1 | * | 2/2002 | Perreault et al. ............. 322/29 |
| 6,433,519 B2 | * | 8/2002 | Taniguchi et al. ............ 322/28 |
| 6,462,517 B2 | * | 10/2002 | Asada ........................ 322/28 |
| 6,526,343 B2 | * | 2/2003 | Saito et al. ................. 701/51 |
| 6,555,993 B2 | * | 4/2003 | Taniguchi et al. ............ 322/28 |
| 6,603,289 B2 | * | 8/2003 | Taniguchi et al. ............ 322/28 |
| 6,614,207 B2 | * | 9/2003 | Maehara et al. ............. 322/28 |
| 6,750,634 B2 | * | 6/2004 | Taniguchi et al. ............ 322/28 |
| 6,756,770 B2 | * | 6/2004 | Watanabe et al. ............ 322/28 |

FOREIGN PATENT DOCUMENTS

| | | | |
|---|---|---|---|
| EP | 0 517 184 A2 | 12/1992 | |
| JP | A 6-207525 | 7/1994 | |
| JP | B2 7-72585 | 8/1995 | |
| JP | 2003174797 A | * 6/2003 | ............. H02P/9/04 |

* cited by examiner

Primary Examiner—Nicholas Ponomarenko
Assistant Examiner—Pedro J. Cuevas
(74) Attorney, Agent, or Firm—Oliff & Berridge, PLC

(57) ABSTRACT

A controller for an alternator driven by an output torque of an automotive engine mechanically through a belt is provided. The controller works to control an exciting current supplied to a field winding of the alternator so as to cancel a change in inertia torque of a rotor of the alternator arising from a change in speed of the engine, thereby minimizing a change in tension of the belt.

10 Claims, 12 Drawing Sheets

INTERNAL COMBUSTION DRIVEN AUTOMOTIVE ALTERNATOR HAVING INERTIAL TORQUE CHANGE CONTROL CIRCUIT

BACKGROUND OF THE INVENTION

1. Technical Field of the Invention

The present invention relates generally to an alternator control apparatus designed to control generation of electrical power in an alternator for use in automotive passenger vehicles or trucks, and more particularly to an alternator control apparatus working to minimize an undesirable change in inertial torque of a rotor of the alternator.

2. Background Art

Most of modern automotive vehicles are so designed that many functions thereof are controlled electronically instead of mechanically. Electric power demands are, thus, increasing for various controls of the vehicles. This results in an increased size of automotive alternators serving as a power supply, which leads to an increased size of a rotor producing a magnetic field inside the alternator, thereby causing the moment of inertia thereof to be increased.

Additionally, an engine compartment is also required to be decreased in size for increasing the volume of a cabin. To this end, adoption of a serpentine belt drive system in which vehicle accessories including an alternator are driven through a single torque transmission belt is progressing in order to save a space in the engine compartment. Such a serpentine belt drive system uses an automatic belt tensioner (will also referred to as an auto-tensioner below) on a transmission line which absorbs a variation in tension of the belt to keep it constant. The use of such an auto-tensioner eliminates the need for a concern about a drop in tension of the belt with time. The tension of the belt is, thus, allowed to be set initially to a lower level.

There is a tendency to decrease the speed of an engine further during an idle mode of engine operation which does not contribute to driving the vehicle and is entered frequently for the sake of earth environmental protection such as decreases in exhaust emission and consumption of fuel. Moreover, a common rail fuel injection system working to elevate the pressure within a combustion chamber of diesel engines greatly is used increasingly for clearing exhaust gasses of the engine.

The above factors are usually combined, thus facilitating ease of occurrence of a variation in idle speed of the engine in synchronization with a power stroke of the engine. An essential problem is an increase in tension of the belt arising from a change in inertia torque of each accessory caused by the variation in idle speed of the engine. Particularly, automotive alternators, as described above, tend to increase the moment of inertia and are higher in pulley ratio than other accessories, which impinges upon the variation in tension of the belt greatly. In recent years, the accessories have increased their capacities and required great driving torques. The transmission of such a great driving torque to each accessory is preferably achieved with the serpentine belt drive system. The serpentine belt drive system requires an increased angle over which a belt is in contact with a pulley of each accessory and a compact layout of the pulleys within the engine compartment. In such a layout, an increased variation in tension of the belts will result in a great swing of the auto-tensioner, which may lead to collision with other accessories driven by the serpentine belt, thereby resulting in a decrease in service life of the auto-tensioner and the belt.

Such a problem is posed notably, particularly in diesel engines because a variation in pressure within a combustion chamber is, as described above, great.

In order to avoid the above problem, Japanese Patent Second Publication No. 7-72585 and U.S. Pat. No. 4,725,259 teach use of a one-way clutch in a pulley of an automotive alternator which is designed to allow torque to be transmitted only in a single direction. Some advantages of the automotive alternator using such a one-way clutch will be described below in brief.

If a pulley having no clutch is used, the speed of the alternator decreases following a decrease in idle speed of the engine. The moment of inertia of a rotor of the alternator works as a motor to keep the speed of the alternator constant, thus loosening a rotation-stretched portion of the belt instantaneously, while stretching a rotation-loosened portion of the belt. The automatic belt tensioner, thus, swings to keep the tension of the belt constant.

If a pulley with a one-way clutch is used with the alternator, the clutch is disengaged by the moment of inertia of the rotor of the alternator when the speed of the engine is dropping (i.e., when the alternator works as a motor), and the speed of the rotor of the alternator is higher than the speed of the pulley, so that the speed of the pulley decreases slowly in synchronization with the speed of the engine. When the speed of the engine is increasing, the clutch remains disengaged until the speed of the pulley increases up to the speed of the rotor of the alternator. This avoids transmission of the inertia torque produced by the moment of inertia of the rotor of the alternator to the pulley, thereby decreasing the instantaneous decrease in tension of the stretched portion of the belt and the instantaneous increase in tension of the loosened portion of the belt, thus minimizing an undesirable change in tension of the whole of the belt.

Japanese Patent First Publication No. 6-207525 discloses a pulley with a bi-directional clutch. A coil spring which has an inner diameter greater than an outer diameter of a sleeve installed on a shaft of a rotor of the alternator is disposed between a pulley and the sleeve and joined at one end to the sleeve and at the other end to the pulley. The elasticity of the coil spring serves to absorb an instantaneous change in tension of the belt during a rise in speed of the engine as well as a drop thereof.

The one-way clutch, as taught in Japanese Patent Second Publication No. 7-72585, has a complex structure in which splines and a roller are engaged and disengaged selectively to establish and block transmission of torque between a pulley and a rotor, so that a large amount of stress is exerted on component parts of the clutch during connection or disconnection thereof. In design of such a type of one-way clutch capable of withstanding harsh conditions of use of the automotive alternator (e.g., a wide range of speed, acceleration, deceleration, and ambient temperature), the trade-off between reduction in size and increase in service life of the clutch is encountered. Specifically, in a case where the pulley ratio is increased to improve output of the alternator in a low-speed range of the engine, reduction in size of the pulley requires reduction in size of the clutch built in the pulley, thus resulting in a decrease in durability due to decreases in fatigue life and applied amount of grease. The manufacturing cost is also increased as compared with typical pulleys for ensuring desired accuracy of parts of the clutch and assembling thereof.

The bi-directional clutch pulley, as taught in Japanese Patent First Publication No. 6-207525, is so constructed that a load is exerted on the coil spring many times in a direction of rotation, thus posing a problem of durability of the coil spring and a spring support supporting ends of the coil spring. Increasing the rigidity of the coil spring to ensure desired durability requires increasing the size of the coil spring and the spring support, thus resulting in an increased size of the clutch pulley. This also makes it difficult to decrease the diameter of the pulley to increase the speed of thereof in order to increase an output power of the alternator meeting increasing electric power demands of automotive vehicles. In recent years, a clutch shoe has been proposed which is disposed between a coil spring and a pulley to decrease a mechanical load on the coil spring while improving the performance of the clutch in one direction. The clutch shoe works to slip to block transmission of the inertia torque of a rotor of the alternator during deceleration of the engine, but however, a difficulty is encountered in removing wear powder produced by the slip of the clutch shoe, which may cause the clutch shoe to be clogged with the wear powder, resulting in a premature decrease in performance of the clutch. The clutch still faces the problem of the increase in size.

SUMMARY OF THE INVENTION

It is therefore a principal object of the invention to avoid the disadvantages of the prior art.

It is another object of the invention to provide a control apparatus for an automotive alternator driven by an automotive engine which works to minimize a change in inertial torque of a rotor arising from a change in speed of the engine, thereby decreasing a change in tension of a belt hung over the alternator and the engine without sacrificing the durability of the alternator and increasing the size thereof.

According to one aspect of the invention, there is provided a control apparatus for an automotive alternator driven by an internal combustion engine installed in a vehicle which comprises: (a) an output voltage control circuit working to supply an exciting current to a rotor of the alternator so as to control an output voltage of the alternator; and (b) an inertial torque reducing control circuit working to perform a inertia torque reducing control which controls the exciting current flowing through the rotor so as to produce a power generating torque at the rotor which serves to reduce a change in inertial torque of the rotor arising from a change in speed of the internal combustion engine.

If a change in speed of the engine during an idle mode of engine operation is within a range of 40 to 100 rpm, a ratio of the speed of the alternator to the speed of the engine is three (3), the number of cylinders of the engine is six (6), and an average idle engine speed is 700 rpm, a frequency of a change in speed of the engine arising from a primary component of explosion will be 35 Hz. In this case, if the moment of inertia of the alternator is $3\times10^{-3}$ kg·m$^2$, we have found that an inertial torque of 4 to 10 Nm is produced during a maximum acceleration of the engine.

A maximum driven torque of typical automotive alternators is several hundreds Nm. A change in tension of a belt hung over the engine and the alternator is, therefore, reduced by controlling the exciting current so as to produce the power generating torque which serves to reduce a change in inertial torque arising from the above change in engine speed, thereby producing substantially the same effect as that in a case where a pulley with a one-way clutch is used. Specifically, the above inertial torque reducing control may be performed easily in a slightly modified conventional controller without increasing production costs to minimize the change in tension of the belt with very high reliability and confidence levels without need for a concern about the durability of a clutch mechanism as used in the conventional system.

In the preferred mode of the invention, the inertia torque reducing control circuit includes a switch which works to control a supply of the exciting current to a fielding winding serving to magnetize field poles of the rotor, a speed determining circuit working to determine whether a speed of the internal combustion engine is lower than a first speed reference value or not, a first control circuit working to perform the inertia torque reducing control when it is determined that the speed of the internal combustion engine is lower than the first speed reference value, and a second control circuit working to perform an output voltage control which controls a switching operation of the switch based on the output voltage of the alternator when it is determined that the speed of the internal combustion engine is higher than the first speed reference value.

When the speed of the engine decreases below the first speed reference value, it results in a decrease in output torque of the engine, so that a change in speed synchronous with a power stroke of the engine becomes great. This causes the torque transmitted through the belt to be changed due to the moment of inertia of the rotor of the alternator, thus causing the tension of the belt to change. Such an event will disappears as the speed of the engine increases. Specifically, when the speed of the engine is low, the change in tension of the belt is decreased by reducing the inertia torque of the rotor.

The first control circuit may be designed to close the switch to supply the exciting current from a higher-voltage power supply designed to develop a voltage higher than a rated output voltage of the alternator when the speed of the engine exceeds a second speed reference value determined as a function of a change in speed of the engine. The first control circuit also works to open the switch to stop the supply of the exciting current and attenuates the exciting current flowing through the field winding using a circulating circuit line when the speed of the engine drops below the second speed reference value.

Typical automotive alternators have an inductance of several hundreds mH and uses a field winding having an electrical resistance of several $\Omega$ in order to develop a required electromotive force with a small exciting current. The time constant of the field winding constituting an exciting circuit is, therefore, approximately 100 msec. This makes it impossible to control the torque by supplying the exciting current in a cycle of the above described 35 Hz engine speed change (i.e., 29 msec.) when the alternator provides a maximum output.

In order to avoid this problem, the higher-voltage power supply is used to supply the voltage higher than the rated output voltage of the alternator to the rotor so that a rated exciting current may flow through the field winding within a short time. For instance, if an exciting voltage of approximately 36V, as shown in FIG. 3, which is three times a normal rated output voltage is applied to the field winding, the exciting current reaches $I_0$ near the rated exciting current 14 msec. (i.e., half of 35 Hz) after the field winding starts to be excited.

The exciting current $I_f$ is expressed by $$I_f=(V_f/R_f)\cdot(1-\exp(-t/\tau))$$

where $\tau$ is the time constant which is given by $L_f/R_f$, $V_f$ is the exciting voltage, and $R_f$ is the resistance value of the field winding.

After the exciting current reaches $I_0$, the switch is opened to attenuate the exciting current through the circulating circuit line. When the speed of the engine exceeds the second speed reference value (e.g., an average of the engine speed), the switch is closed, while when the speed of the engine drops below the second speed reference value, the switch is opened, thereby producing the power generating torque which serves to decrease the change in inertia torque of the rotor in order to minimize the change in tension of the belt.

The circulating circuit line may have disposed therein a resistor which has a resistance value of at least ten times an electrical resistance of the field winding. This facilitates the attenuation of the exciting current after the supply of the exciting current is stopped.

The exciting current $I_f$ after the supply of the exciting current is stopped is expressed as $$I_f = (I_0 + V_d/(R_f + R_b)) \cdot \exp(-(R_f + R_b) \cdot t/L_f) - V_d/(R_f + R_b)$$

where $R_b$ is the resistance value of the resistor, and $V_d$ is an on-voltage in the circulating circuit line.

The circulating circuit line may have disposed therein a rectifying device which has a forward on-voltage that is higher than a rated output voltage of the alternator. This provides the same effect as that in a case where a resistor having a higher resistance value is used, thus permitting the size of the control apparatus to be reduced and resulting in improved reliability thereof. The rectifying device may be made up of a plurality of diodes connected in series or a combination of a normal diode and a zener diode which are so connected in series as to have opposite polarities.

The exciting current $I_f$ after the supply of the exciting current is stopped may be expressed as $$I_f = (I_0 + V_b/R_f) \cdot \exp(-R_f t/L_f) - V_b/R_f$$

where $V_b$ is the on-voltage of a circulating device (consisting of the rectifying device and a circulating diode).

The field winding of the alternator may have a time constant of several msec. In this case, the first control circuit supplies the exciting current from a lower-voltage power supply designed to develop a voltage substantially identical with a rated output voltage of the alternator during a deceleration time when the speed of the engine decreases. The first control circuit opens the switch to stop the supply of the exciting current and attenuates the exciting current flowing through the field winding through a circulating circuit line during a deceleration time when the speed of the engine decreases. The use of such a high-response exciting circuit results in greatly improved response rate of the exciting current. Thus, during the deceleration time when the speed of the engine decreases, that is, when the moment of inertia of the alternator works as a motor, the switch is closed to decrease the inertia torque of the rotor through the power generating torque, while during the acceleration time when the speed of the engine increases, the switch is opened to avoid addition of the power generating torque to the inertial torque. This results in a decreased change in torque, thus minimizing the change in tension of the belt.

The control apparatus may further comprise a speed change rate determining circuit which determines a change rate of the speed of the engine. The first control circuit works to change a duty cycle of a signal used to turn on and off the switch as a function of the change rate of the speed of the engine as determined by the speed change rate determining circuit during the deceleration time. The determination of the change rate of the speed of the engine results in ease of determination of the deceleration time when the speed of the engine decreases, thereby facilitating ease of control of the power generating torque by the supply of the exciting current in synchronization with the speed of the engine. Changing the duty cycle as a function of the change rate of the speed of the engine permits the power generating torque to be change smoothly, thus enhancing the effect of reducing the change in inertia torque of the rotor.

The inertia torque reducing control may be performed on the alternator which is driven mechanically by an output torque of the engine through a belt. This minimizes an undesirable change in tension of the belt, thereby decreasing a rise in temperature of the belt due to slippage thereof and wear of the belt.

The alternator may be joined mechanically to the engine through a serpentine drive system which has a tensioner (e.g., automatic belt tensioner) working to keep tension of the belt constant. The use of the inertial torque reducing control with the serpentine drive system minimizes undesirable movement of the automatic belt tensioner, thus avoiding mechanical interference of the automatic belt tensioner with other vehicle accessories. This also permits the tension of the belt to be decreased, thus resulting in increased service life of the automatic belt tensioner and rotary parts supports (e.g., bearings) of vehicle accessories driven by the serpentine drive system.

The control apparatus may further comprise a speed determining circuit which works to determine the speed of the engine using the quantity of electricity as a function of frequency of a generated power of the alternator. This eliminates the need for a separate speed sensor for determining the speed of the engine, thus resulting in a decrease in manufacturing costs of the control apparatus.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
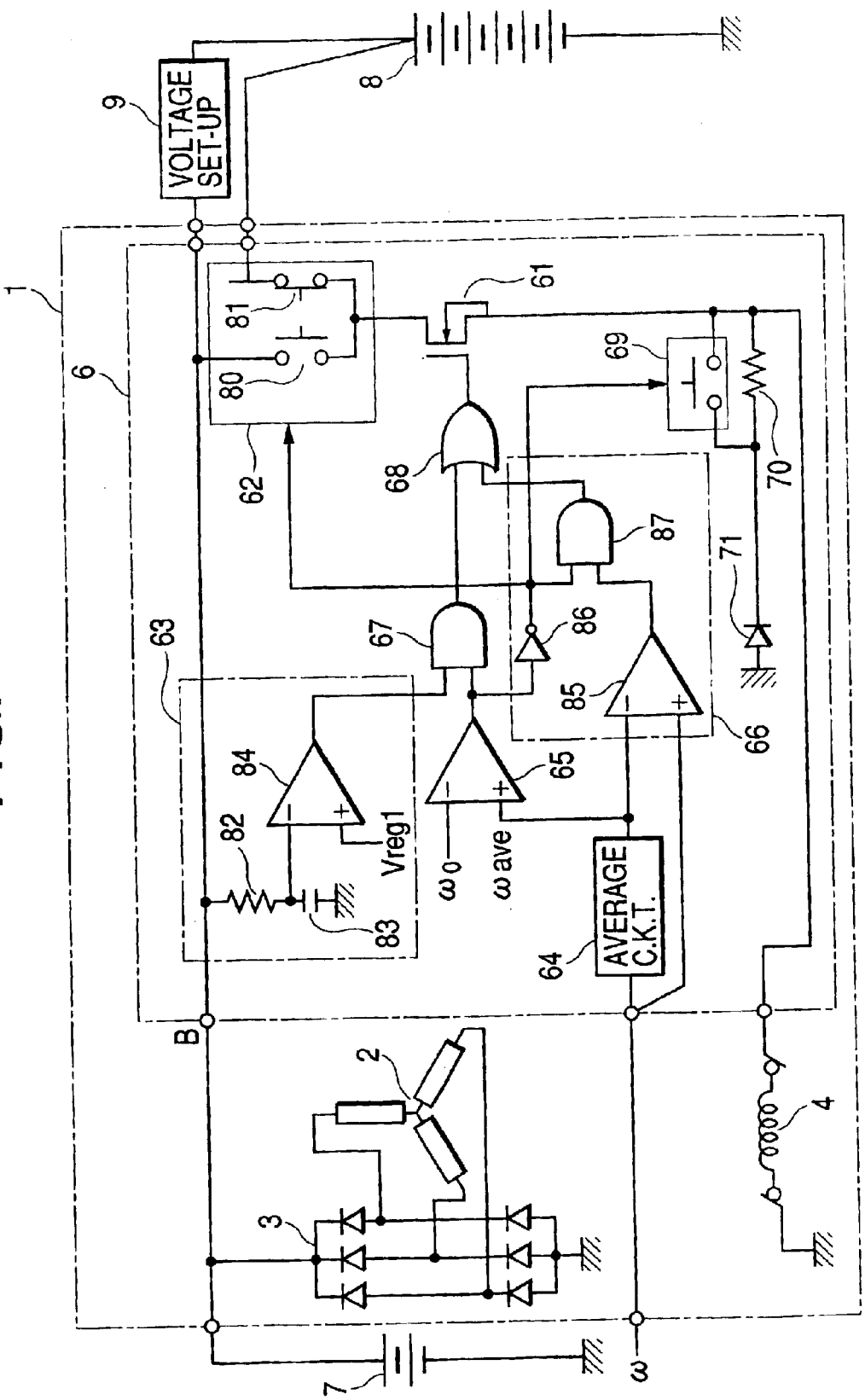
FIG. 1 is a block diagram which shows an automotive alternator according to the first embodiment of the invention.

Referring to the drawings, wherein like reference numbers refer to like parts in several views, particularly to FIG. 1, there is shown an automotive alternator 1 according to the first embodiment of the invention.

The alternator 1 includes an armature winding 2, a rectifier 3, a field winding 4, and a controller 6 and is driven by torque transmitted from an internal combustion engine of an automotive vehicle through a belt of a serpentine drive system so that it rotates only in a single direction. The serpentine drive system has installed therein an automatic belt tensioner working to keep the tension of the belt constant. The serpentine drive system is well known in the art, and explanation thereof in detail will be omitted here.

The armature winding 2 is a multi-phase winding (e.g., a three-phase winding) made of a coil wound around an iron core to form an armature. The armature winding 2 produces an AC output and supplies it to the rectifier 3. The rectifier 3 is implemented by a full-wave rectifier which converts the AC output of the armature winding 2 into a DC output and uses diode pairs one pair for each of phases of the armature winding 2.

The field winding 4 works to produce an interlinking magnetic flux required to develop the voltage at the armature winding 2. The field winding 4 is made of a coil wound around a field pole (not shown).

The controller 6 works to control the current applied to the field winding 4 to bring an output voltage of the alternator 1 to within a preselected range and also reduce the inertia torque of a rotor of the alternator 1 when the speed of the rotor is changing.

To the alternator 1, two batteries 7 and 8 and a voltage step-up device 9 are joined. The battery 7 works as a normal voltage power supply which provides a given terminal voltage (e.g., 12V) and is charged directly by the alternator 1. The battery 8 works as a high-voltage power supply which provides a terminal voltage (e.g., 36V) higher than a rated voltage outputted from the alternator 1 and the terminal voltage of the battery 7 and is charged by stepping up the voltage output of the alternator 1 through the voltage step-up device 9.

The controller 6, as shown in FIG. 1, consists of a power transistor 61, a relay 62, a voltage control circuit 63, an average circuit 64, a voltage comparator 65, an inertia torque reducing control circuit 66, an AND circuit 67, an OR circuit 68, a short-circuiting relay 69, a resistor 70, and a circulating diode 71.

The power transistor 61 is connected directly to the field winding 4 and works as a switch which supplies the exciting current to the field winding 4 selectively. The relay 62 includes two contacts 80 and 81 and is responsive to a control signal inputted from the inertia torque reducing control circuit 66 to select one of the batteries 7 and 8 which should be engaged in supplying the exciting current to the field winding 4 exclusively. Specifically, if the control signal is in a low level, the contact 80 is closed to establish electrical connection between the battery 7 and the field winding 4. Alternatively, if the control signal is in a high level, the contact 81 is closed to establish electrical connection between the high-voltage battery 8 and the field winding 4.

The voltage control circuit 63 works to control the output voltage of the alternator 1 to bring it to within the preselected range. The voltage control circuit 63 consists of a resistor 82, a capacitor 83, and a voltage comparator 84. The resistor 82 and the capacitor 83 form a low-pass filter of a CR circuit to remove high-frequency components from the voltage output of the alternator 1. The voltage comparator 84 compares an output voltage of the low-pass filter with a reference value Vreg1. The reference voltage Vreg1 is provided for controlling the output voltage of the alternator 1 and set to, for example, 14.5V. If the output voltage of the low-pass filter is lower then the reference value Vreg1, the voltage comparator 84 produces a voltage output of a high level. The voltage output is inputted to a gate of the power transistor 61 through the AND circuit 67 and the OR circuit 68, thereby causing the power transistor 61 to be closed to supply the exciting current to the field winding 4.

The average circuit 64 determines an average of a speed signal $\omega$ inputted from a speed sensor (not shown) which indicates the speed of the internal combustion engine and produces an output voltage as a function of the average. For example, the speed signal $\omega$ is given by a DC voltage changing as a function of the speed of the engine. In this case, the average circuit 64 may be formed by a low-pass filter.

The voltage comparator 65 compares the average value $\omega_{ave}$ determined by the average circuit 64 with a first speed reference value $\omega_0$. If the average value $\omega_{ave}$ is greater than the first speed reference value $\omega_0$, an output signal of the voltage comparator 65 is used to control the exciting current. Alternatively, if the average value $\omega_{ave}$ is smaller than the first speed reference value $\omega_0$, an output signal of the inertia torque reducing control circuit 66 is used to control the exciting current.

The inertia torque reducing control circuit 66 works to adjust the exciting current supplied to the field winding 4 to control a power generating torque of the rotor of the alternator 1 for decreasing a change in inertia torque of the rotor arising from a change in speed of the internal combustion engine. The inertia torque reducing control circuit 66 consists of a voltage comparator 85, an inverter circuit 86, and an AND circuit 87. The voltage comparator 85 compares an instantaneous value of the speed signal $\omega$ with a second speed reference value which is given by the average value $\omega_{ave}$ determined by the average circuit 64 as a function of a change in speed of the internal combustion engine. If the speed signal $\omega$ is greater than the second speed reference value (i.e., the average value $\omega_{ave}$), the voltage comparator 85 produces a voltage output of a high level. Alternatively, if the speed signal $\omega$ is smaller than the second speed reference value, the voltage comparator 85 produces a voltage output of a low-level. The output of the voltage comparator 85 is inputted to the OR circuit 68 through the AND circuit 87. An output of the inverter 86 is inputted to the relay 62 as the control signal, as described above, for switching between the contacts 80 and 81.

The AND circuit 67 receives the outputs of the voltage comparator 65 and the voltage control circuit 63 and provides the output of the voltage control circuit 63 to the OR circuit 68 when the output of the voltage comparator 65 is in the high-level.

The short-circuiting relay 69 is closed when the output of the inverter circuit 86 is in the low-level to short-circuit ends of the resistor 70. The circulating diode 71 is connected in parallel to the field winding 4 and works to circulate the field current when the power transistor 61 is opened. The resistor 70 has, for example, at least ten times an electric resistance of the field winding 4 and works to attenuate the exciting current flowing through the circulating diode 71 when the short-circuiting relay 69 is opened. When the short-circuiting relay 69 is closed, it will cause the circulating diode 71 to form a circulating circuit line. Alternatively, when the short-circuiting relay 69 is opened, it will cause the circulating diode 71 to form a circulating circuit line together with the resistor 70.

An operation of the alternator 1 will be described below.

When the speed of the internal combustion engine is lower than the first speed reference value $\omega_0$, an output torque of the engine is small, thus resulting in a great change in speed synchronizing with a power stroke of the engine. At this time, the torque of the rotor of the alternator 1 changes due to the inertia torque of the rotor, thereby causing the tension of the belt hung over the alternator 1 and the engine to change. Such an event usually disappears as the speed of the engine increases. The alternator 1, therefore, does not require inertia torque reducing control when the average value $\omega_{ave}$ of the speed of the engine is higher than the first speed reference value $\omega_0$.

When the speed signal $\omega$ indicative of the speed of the engine is inputted, the average circuit 64 calculates the average value $\omega_{ave}$ of the speed signal $\omega$. The voltage comparator 65 compares the average value $\omega_{ave}$ with the first speed reference value $\omega_0$. If the average value $\omega_{ave}$ is greater than the first speed reference value $\omega_0$, the voltage comparator 65 outputs the voltage signal of the high level. The AND circuit 67, thus, provides the output of the voltage control circuit 63 to the OR circuit 68 as it is. When the output of the voltage comparator 65 changes to the high level, it will cause the inverter circuit 86 to provide an output of the low level. Upon input of the low-level output of the inverter circuit 86, the AND circuit 87 blocks an output signal of the voltage comparator 85 of the inertia torque reducing control circuit 66 to disable the inertia torque reducing control circuit 66. Additionally, when the output of the inverter circuit 86 changes to the low level, it will also cause the relay 62 to close the contact 80, thus establishing the electric connection between the battery 7 and the power transistor 61. The short-circuiting relay 69 is also closed to short-circuit the ends of the resistor 70.

Specifically, when the speed of the engine is relatively high, the circulating diode 71 is connected directly to the field winding 4 in parallel, and the output voltage of the alternator 1 is controlled to the reference value Vregl using the normal voltage battery 7 without performing the inertia torque reducing control.

When the speed of the engine is relatively low, so that the average value $\omega_{ave}$ is smaller than the first speed reference value $\omega_0$, the voltage comparator 65 outputs the voltage signal of the low level. The inverter circuit 86 inverts in level the output signal of the voltage comparator 65 and provides a high-level signal to the AND circuit 87. The AND circuit 87 supplies the output signal of the voltage comparator 85 of the inertia torque reducing control circuit 66 to the OR circuit 68 as it is. When the output of the voltage comparator 65 changes to the low level, it will cause the AND circuit 67 blocks the output signal of the voltage comparator 84 of the voltage control circuit 63 to disable the voltage control circuit 63. Additionally, when the output of the inverter circuit 86 changes to the high level, it will also cause the relay 62 to close the contact 81, thus establishing the electric connection between the high-voltage battery 8 and the power transistor 61. The short-circuiting relay 69 is opened to establish a series connection of the circulating diode 71 and the resistor 70.

Specifically, when the speed of the engine is relatively low, the inertia torque reducing control circuit 66 is activated. The circulating circuit line is formed which consists of the circulating diode 71 and the resistor 70. The exciting current is supplied from the high-voltage battery 8 to the field winding 4 to perform the inertia torque reducing control.

Figure 2:
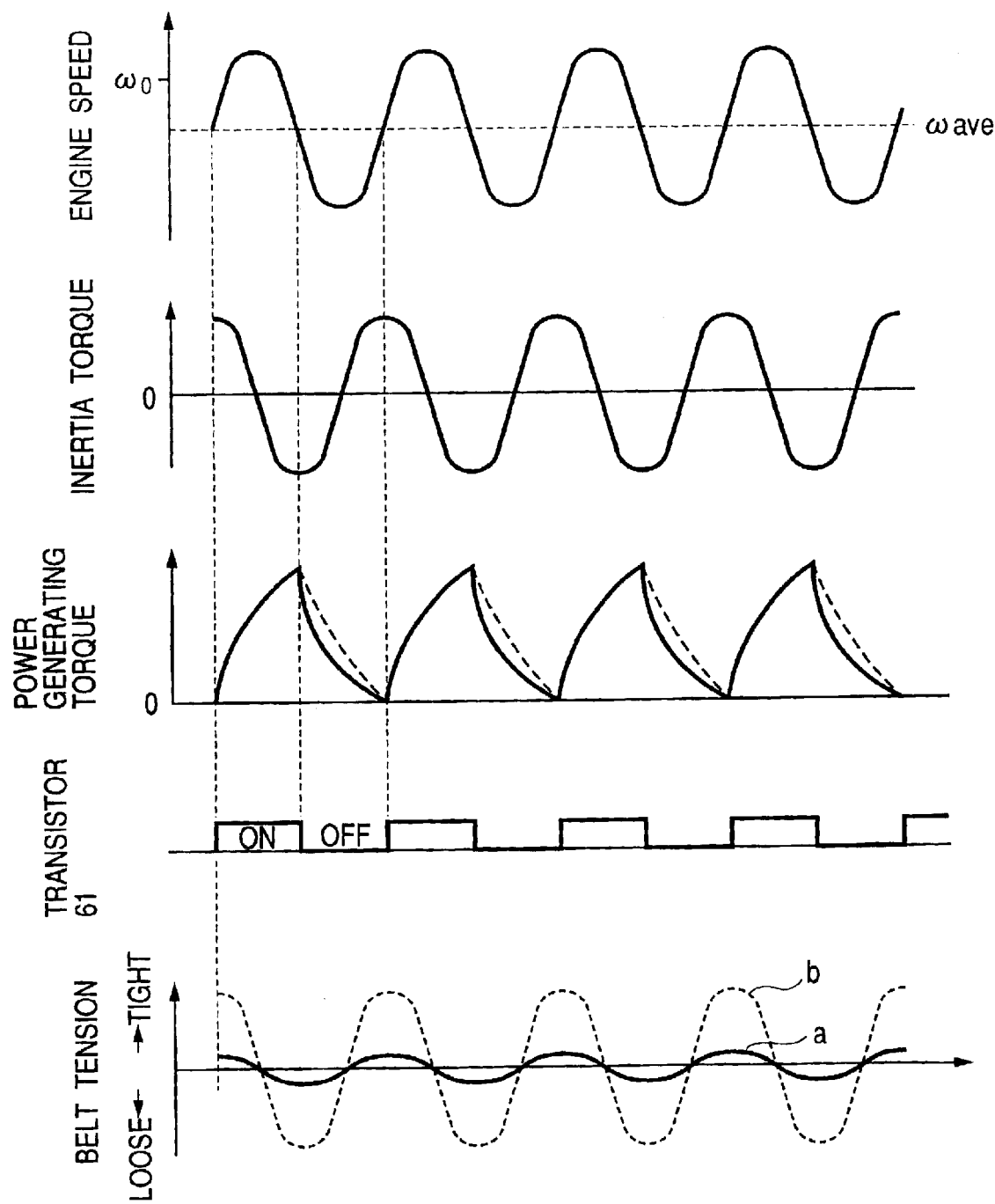
FIG. 2 is a time chart which shows an operation of the alternator of FIG. 1.

FIG. 2 is a time chart which shows the speed $\omega_0$ of the engine, the inertia torque of the rotor of the alternator 1, the power generating torque of the alternator 1, an on-off state of the power transistor 61 ("ON" indicates an open state, "OFF" indicates a closed state), and the tension of the belt for transmitting the torque of the engine to the alternator 1. A solid line a, as illustrated on a lower portion of the drawing, indicates a measured value of the tension of the belt hung over the engine and the alternator 1 of this embodiment. A broken line b indicates a value of the tension of a belt hung over the engine and a conventional alternator measured without the inertial torque reducing control. The same applies to FIGS. 6 and 7 as will be discussed later.

The inertia torque reducing control circuit 66 works to close the power transistor 61 to supply the exciting current from the high-voltage battery 8 to the field winding 4 when an instantaneous value of the speed signal $\omega$ exceeds the average value $\omega_{ave}$. At this time, the speed of the alternator 1 changes in a short cycle of, for example, 50 to 25 msec. (i.e., 20 to 40 Hz). A change in the exciting current, thus, needs to follow such a short cycle. The time constant of a field winding of typical automotive alternators is designed to have several hundreds msec. It is, thus, impossible to have the exciting current follow the change in speed of the alternator 1 sufficiently using the normal voltage battery 7. In order to avoid this problem, the alternator 1 uses the high-voltage battery 8 to supply the exciting current to the field winding 4, thereby producing a change in the exciting current enough to compensate for a change in the power-generating torque of the alternator 1 in the short cycle. The resistor 70 is placed in series connection with the circulating diode 71 in order to facilitate attenuation of the circulating current when the power transistor 61 is opened. The exciting current supplied from the high-voltage battery 8, thus, attenuates quickly when the power transistor 61 is opened.

Figure 3:
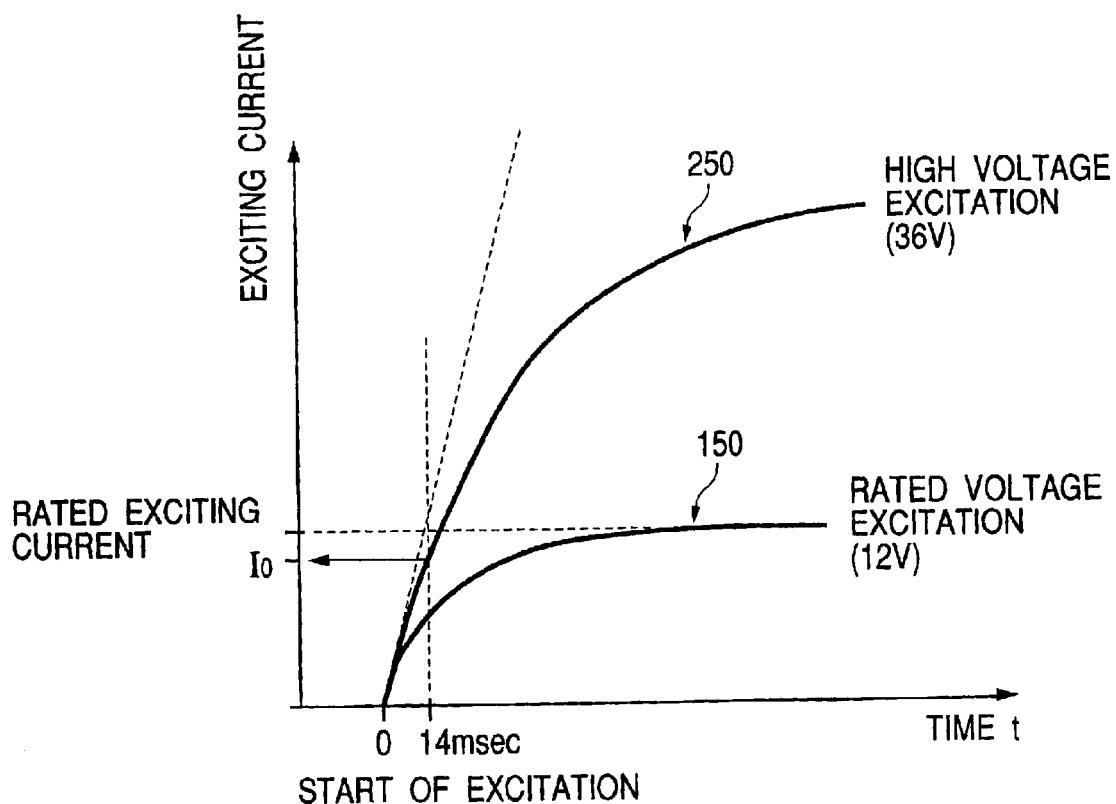
FIG. 3 is a graph which shows a change in exciting current when different voltage power supplies are switched.

FIG. 3 shows a change in exciting current supplied to the field winding 4 for different voltages of a power supply thereof. The line 150 indicates a change in the exciting current when the normal voltage battery 7 whose rated voltage is 12V is used. The line 250 indicates a change in the exciting current when the high-voltage battery 8 whose rated voltage is 36V is used. The graph shows that the use of the high-voltage battery 8 produces a desired great change in the exciting current within a short time.

The controller 6 of the alternator 1, as is apparent from the above discussion, works to turn on and off the power transistor 61 cyclically in synchronization with the speed $\omega$ of the engine to minimize a change in inertial torque of the alternator 1, thereby decreasing a change in tension of the belt hung over the engine and the alternator 1 without use of a clutch pulley.

Figure 4:
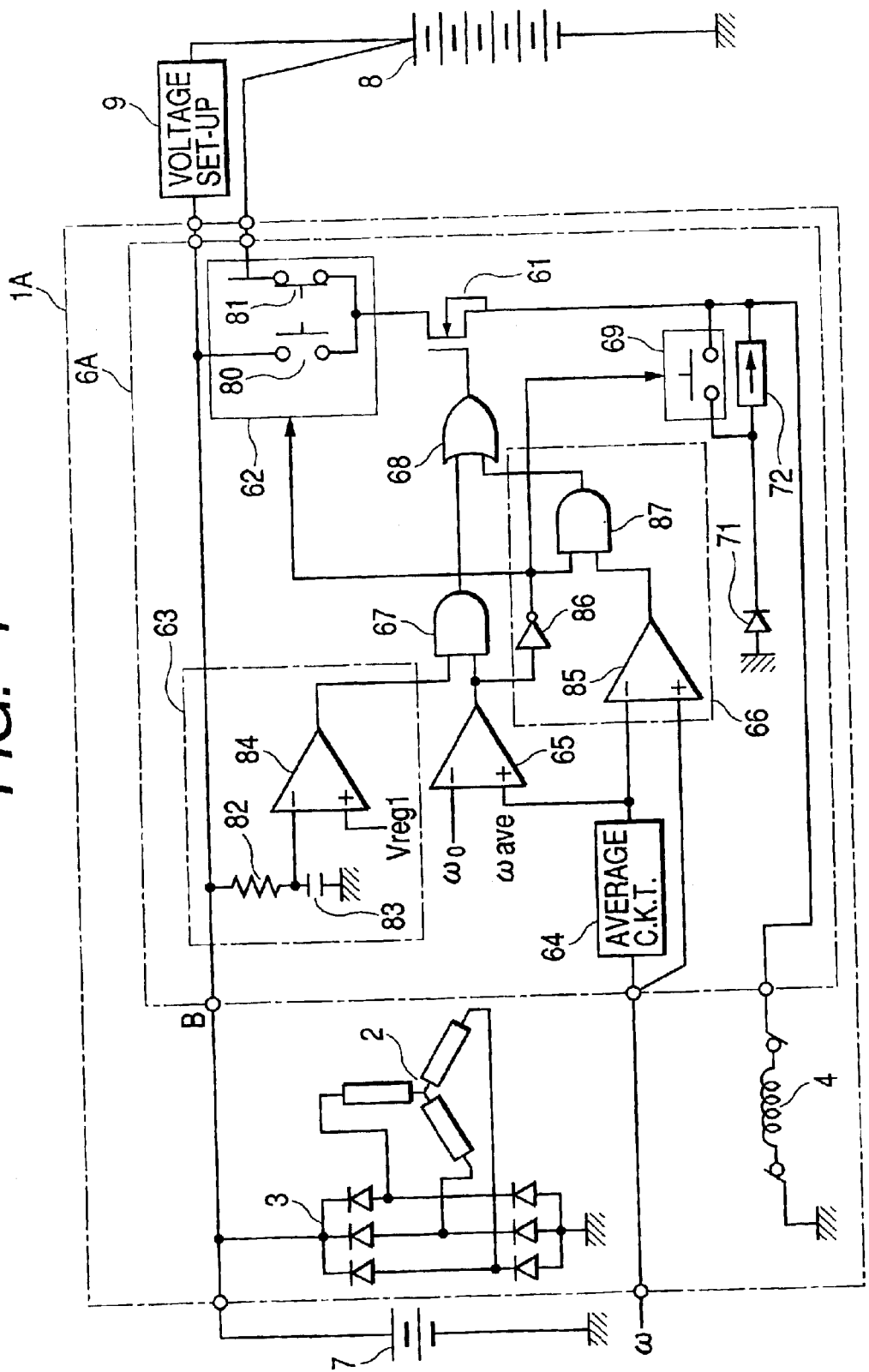
FIG. 4 is a block diagram which shows a modification of the alternator shown in FIG. 1.

FIG. 4 shows a modification of the first embodiment. The alternator 1A includes the armature winding 2, the rectifier 3, the fielding winding 4, and the controller 6A. The alternator 1A is different from the alternator 1 of FIG. 1 only in a structure of the controller 6A. Other arrangements are identical, and explanation thereof in detail will be omitted here.

The controller 6A consists of the power transistor 61, the relay 62, the voltage control circuit 63, the average circuit 64, the voltage comparator 65, the inertia torque reducing control circuit 66, the AND circuit 67, the OR circuit 68, the short-circuiting relay 69, the resistor 70, the circulating diode 71, and a rectifying device 72. Specifically, the controller 6A is different from the controller 6 of the first embodiment in the rectifying device 72 is connected in series with the circulating diode 71 instead of the resistor 70. Other arrangements are identical, and explanation thereof in detail will be omitted here.

The rectifying device 72 has an extremely high forward on-voltage which is, for example, more than or equal to the rated output voltage of the alternator 1A. The rectifying device 72 may be made up of diodes connected in series or a normal diode and a zener diode which are so connected in series as to have opposite polarities.

The circulating diode 71 and the rectifying device 72 forms a circulating line which works to decrease a rate at which the exciting current supplied to the field winding 4 is attenuated when the power transistor 61 is in the closed state. This results in, as indicated by a broken line in FIG. 2, a gentle drop of the power generating torque of the alternator 6A, thereby enhancing an effect of controlling a change in tension of the belt.

The alternators 6 and 6A may use an electrical energy storage device such as a capacitor instead of the high-voltage battery 8. The use of the capacitor results in an increased response rate of control of the power generating torque of the alternator as compared with the battery 8 producing the electrical energy chemically.

Figure 5:
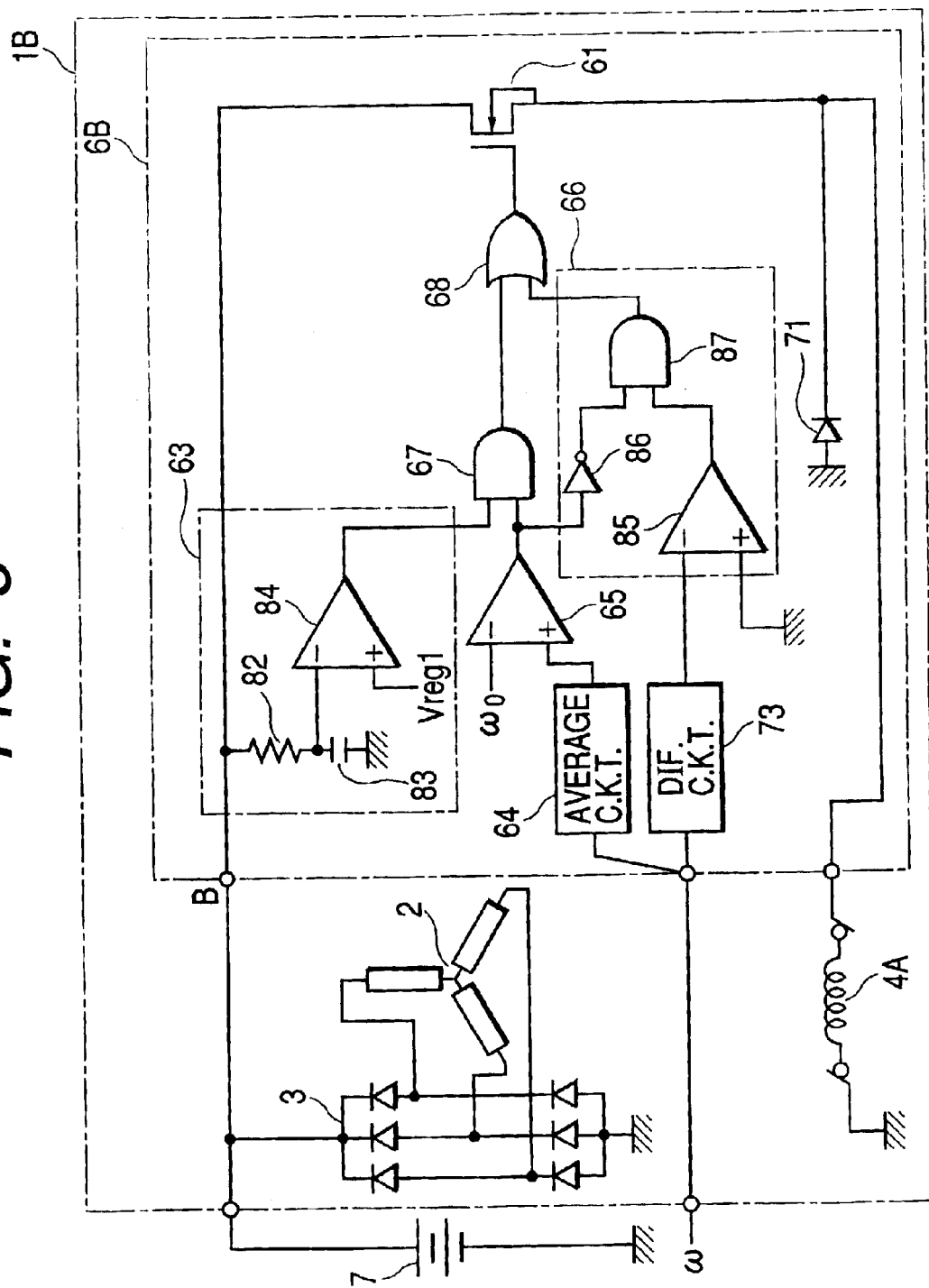
FIG. 5 is a block diagram which shows an automotive alternator according to the second embodiment of the invention.

FIG. 5 shows the automotive alternator 1B according to the second embodiment of the invention.

The alternator 1B includes the armature winding 2, the rectifier 3, the field winding 4A, and the controller 6B. The alternator 1B is different from the alternator 1 of FIG. 1 in structures of the controller 6B and the field winding 4A. Other arrangements are identical, and explanation thereof in detail will be omitted here.

The field winding 4A has a time constant which is extremely short (e.g., several msec.), thereby speeding up supply of the exciting current to the field winding 4 when the power transistor 61 of the controller 6B is closed. This eliminates the need for the high-voltage battery 8, the voltage step-up device 9 working to charge the battery 8, and the relay 62 working to establish electrical connection between the battery 8 and the power transistor 61 which are used in the first embodiment of FIG. 1, thus resulting in a simple structure of the alternator 6B.

The controller 6B includes the power transistor 61, the voltage control circuit 63, the average circuit 64, the voltage comparator 65, the inertia torque reducing control circuit 66, the AND circuit 67, the OR circuit 68, the circulating diode 71, and a differentiating circuit 73. Specifically, the controller 6B is different from the controller 6 of the first embodiment in that the differentiating circuit 73 is installed without use of the relay 62, the short-circuiting relay 69, and the resistor 70. Other arrangements are identical, and explanation thereof in detail will be omitted here.

The differentiating circuit 73 works to differentiate the speed signal ω to produce a voltage signal indicative of the rate of change in speed signal ω. The output voltage of the differentiating circuit 73 has a negative polarity when the speed signal ω is indicating decreasing of the speed of the engine, while it has a positive polarity when the speed signal ω is indicating increasing of the speed of the engine.

The voltage comparator 85 of the inertia torque reducing control circuit 66 is connected at a minus terminal to an output terminal of the differentiating circuit 73 and at a plus terminal to ground.

Figure 6:
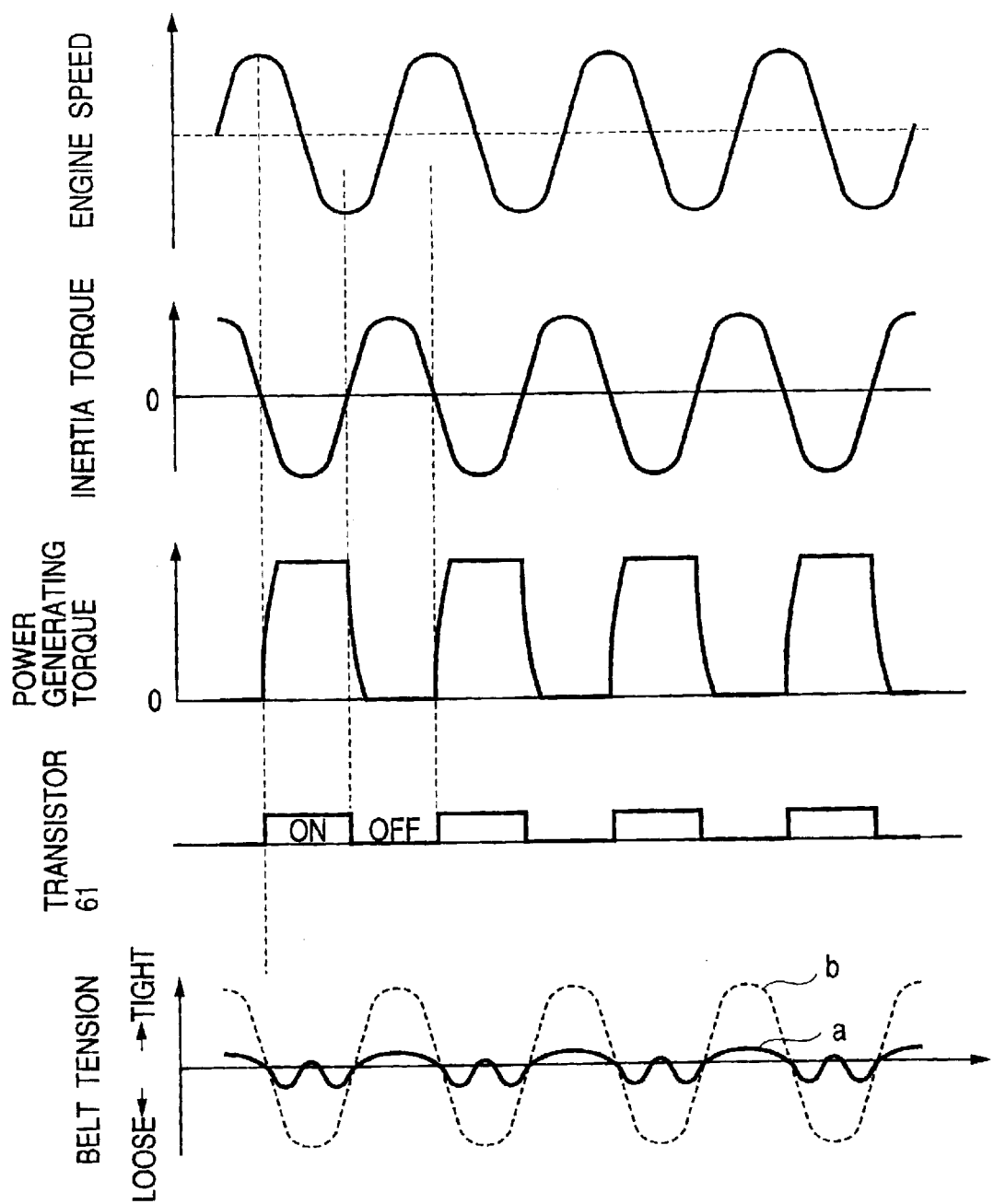
FIG. 6 is a time chart which shows an operation of the alternator of the second embodiment as shown in FIG. 5.

In operation, as can be seen from a time chart of FIG. 6, upon initiation of decrease in speed of the engine, the differentiating circuit 73 outputs the voltage signal having the negative polarity, thereby causing the voltage comparator 85 to output a signal of the high level, so that the power transistor 61 is closed to initiate supply of the exciting current to the field winding 4. The use of the field winding 4A whose time constant is extremely short results in both a rapid increase in exciting current immediately after the power transistor 61 is closed and a rapid decrease in exciting current immediately after the power transistor 61 is opened, so that a cycle in which the power-generating torque increases substantially matches a cycle in which the engine speed decreases, thereby decreasing a change in tension of the belt greatly.

A response of the exciting current to a switching action of the power transistor 61 is high, thus resulting in, as shown in FIG. 6, a stepwise change in power generating torque of the alternator 1B, which may cause a little change in tension of the belt to arise. This change, however, may be decreased by providing a signal having a duty cycle as a function of a differentiated value of the engine speed (i.e., the output of the differentiating circuit 73) to switch the power transistor 61 on and off at high speeds so that he power generating torque of the alternator 1B may be changed to decrease a change in inertia torque further.

Figure 7:
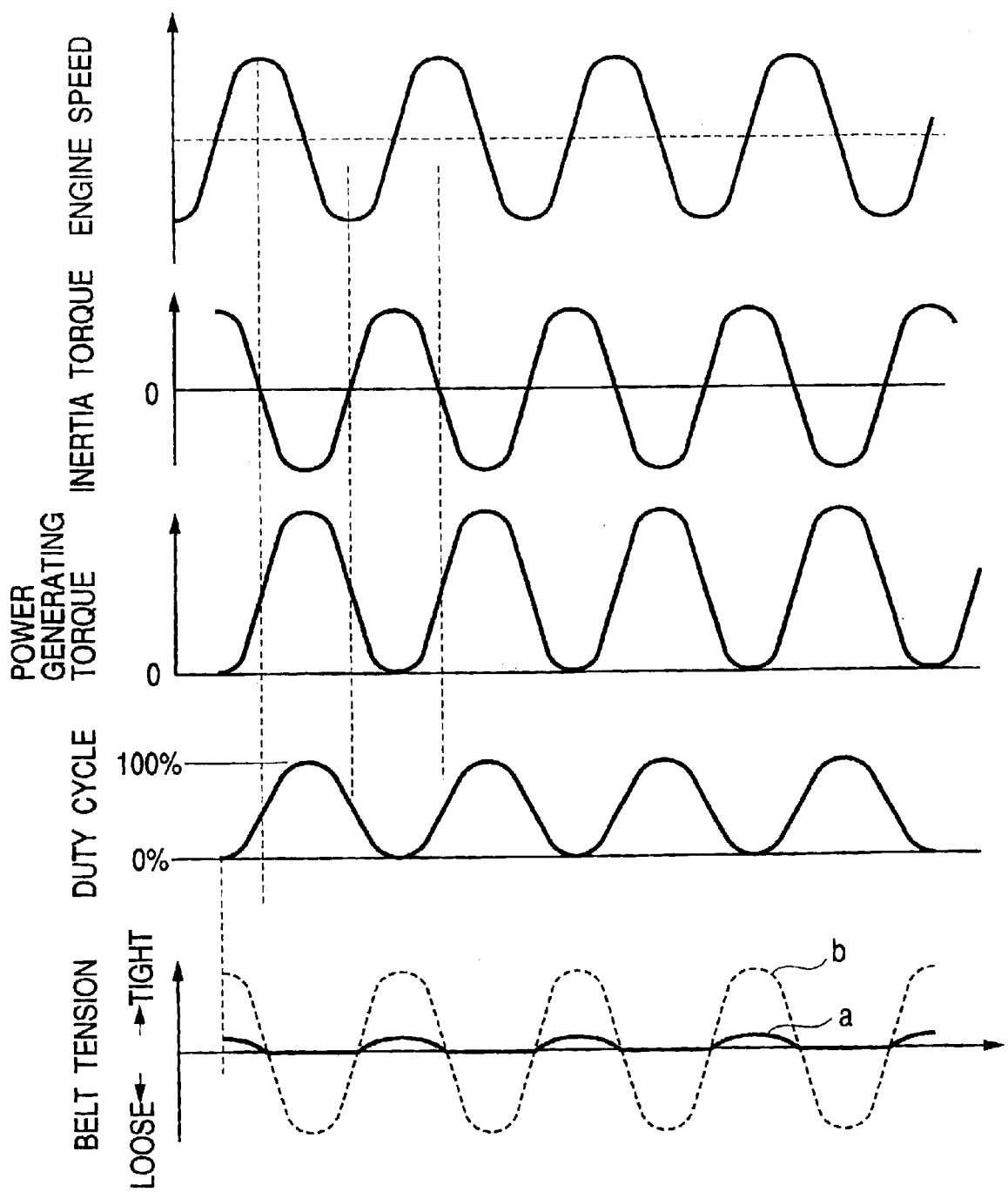
FIG. 7 is a time chart which shows an operation of a duty cycle-controlled alternator.

FIG. 7 shows an operation of a modified form of the alternator 1B designed to switch the power transistor 61 on and off at high speeds using the signal, as described above, having the duty cycle as a function of the output of the differentiating circuit 73.

The duty cycle of the signal used to switch the power transistor 61 on and off shows 100% substantially at the center of a period of time during which the engine speed decreases, that is, when the output of the differentiating circuit 73 has a minimum value, while it shows 0% substantially at the center of a period of time during which the engine speed increases, that is, when the output of the differentiating circuit 73 has a maximum value. Switching the power transistor 61 on and off using such a duty cycle-controlled signal causes the exciting current supplied to the field winding 4 to change slowly, thus eliminating a sharp change in power generating torque of the alternator 1B, as shown in FIG. 6.

Instead of the above duty cycle-controlled signal, the switching of the power transistor 61 may be controlled using an output voltage of the alternator 1B.

The speed signal ω indicative of the speed of the engine used in the alternators 1, 1A, and 1B is produced by the external speed sensor, but may be made by using a phase-voltage of the armature winding 2, as discussed below.

Figure 8:
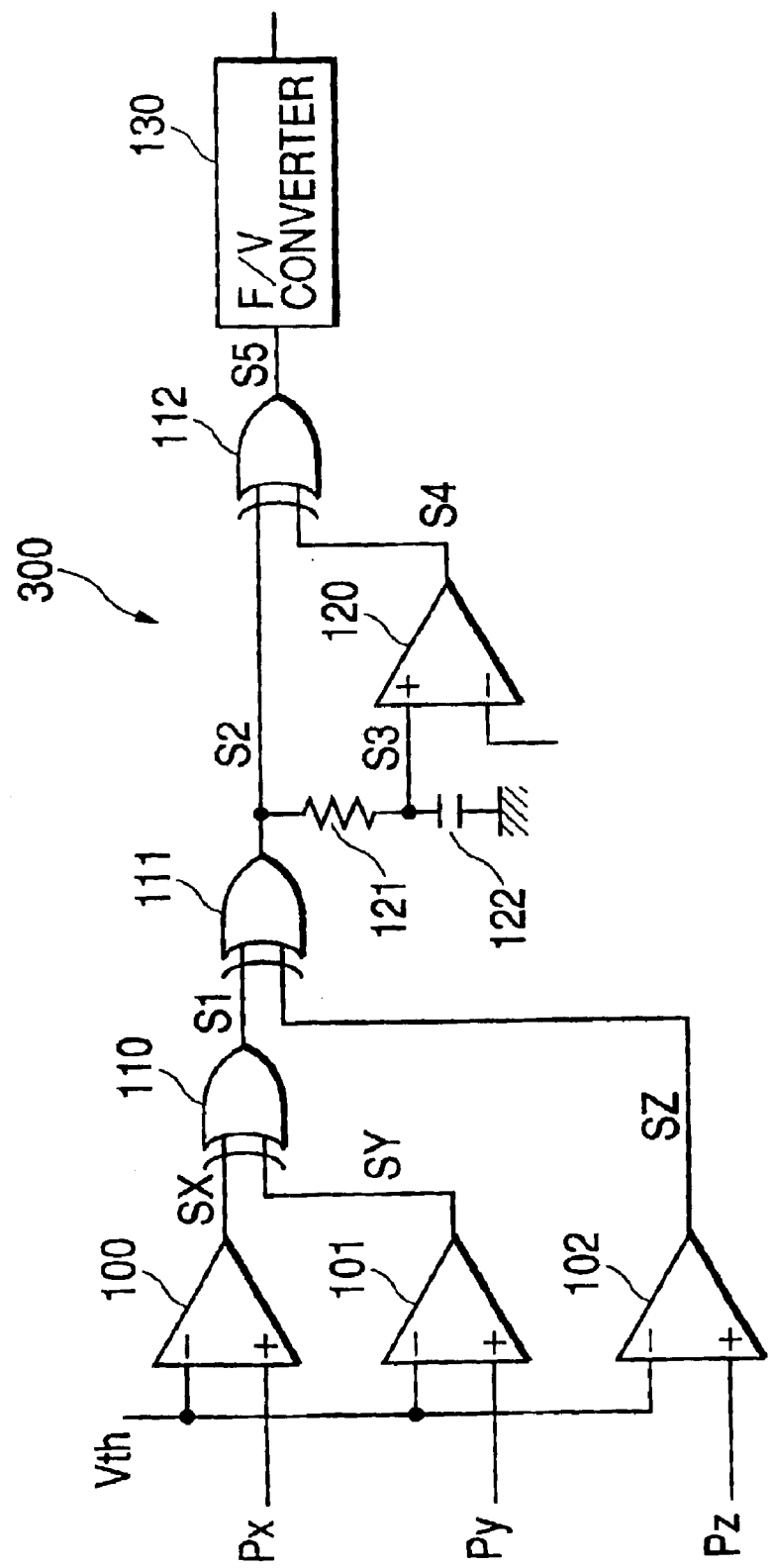
FIG. 8 is a block diagram which shows a circuit structure of a speed determining circuit working to determine the speed of an engine using phase voltages of an armature of an alternator.
Figure 9:
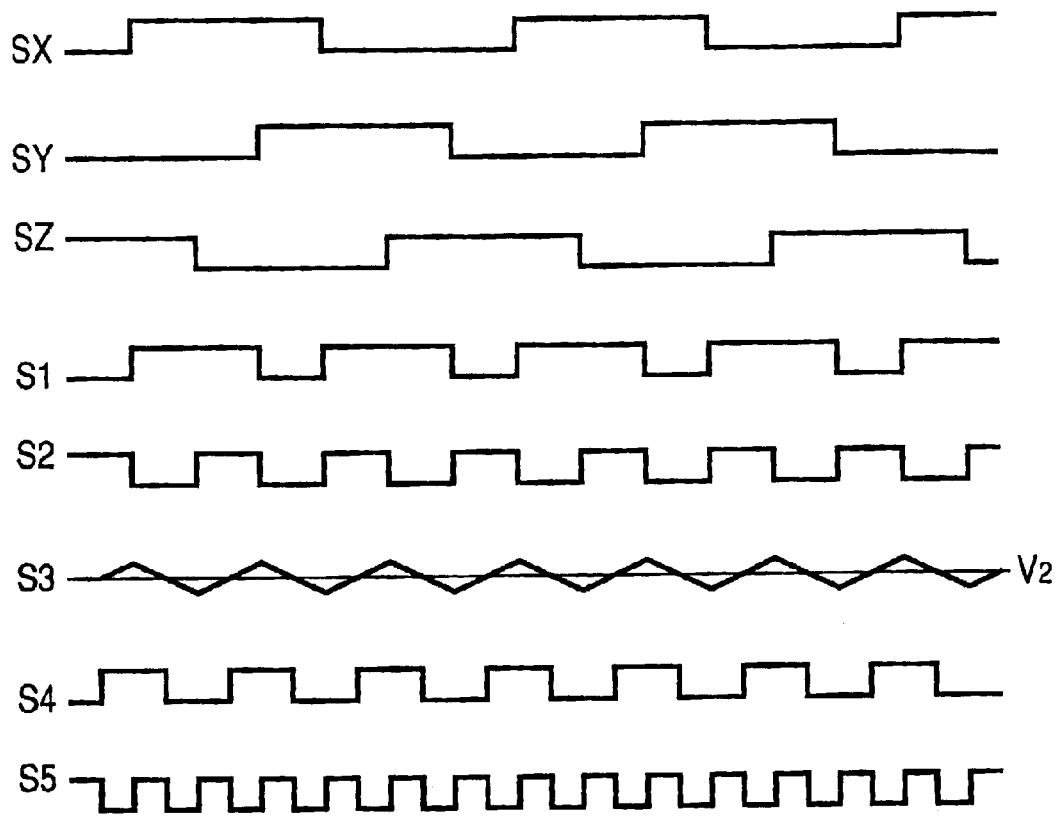
FIG. 9 is a time chart which shows an operation of the speed determining circuit of FIG. 8.

FIG. 8 shows a speed determining circuit 300 designed to produce the speed signal ω as a function of the phase voltage of the armature winding 2. FIG. 9 shows signals used in the speed determining circuit 300.

The speed determining circuit 300 is designed to determine the speed of the engine (i.e., the speed signal ω) based on the quantity of electricity as a function of frequency of an output power of, for example, the alternator 1 and consists of voltage comparators 100, 101, 102, and 120, exclusive OR circuits 110, 111, and 112, a resistor 121, a capacitor 122, and an F/V (speed-to-voltage) converter 130.

The voltage comparators 100, 101, and 102 work to convert the three-phase voltages Px, Py, and Pz of the armature winding 2 into pulse signals, respectively. The pulse signals are processed through a CR circuit made up of the exclusive OR circuits 110 and 111, the resistor 121, and the capacitor 122, the voltage comparator 120, and the exclusive OR circuit 112 to produce a speed pulse signal which has a frequency of six times a power generating fundamental frequency. The speed pulse signal is converted by the F/V converter 130 into a voltage signal to produce a speed signal identical with the speed signal ω used in the above embodiments. Since the speed pulse signal outputted from the exclusive OR circuit 112 has, as described above, the frequency of six times the power generating fundamental frequency, if the alternator has twelve poles, a $36^{th}$-order speed pulse signal is produced. If the alternator has sixteen poles, a $48^{th}$-order speed pulse signal. Specifically, the speed determining circuit 300 which works to produce the speed signal following a fast change in speed of the engine in synchronization with a power stroke of the engine is realized in the alternator, thus eliminating the need for a conductor extending outside the alternator to monitor the speed of the engine.

The reference voltage Vth inputted to the voltage comparators 100, 101, and 102 used to convert the three-phase voltages Px, Py, and Pz of the armature winding 2 into the pulse signals is preferably set to about 0.5V. Even if a period of time during which no exciting current is supplied to the field winding 4 is prolonged, so that the voltage induced at the armature winding 2 attenuates extremely, the field poles remain magnetized, thereby causing a minute electromotive force to be generated. However, use of the reference voltage Vth of about 0.5V enables the minute electromotive force to be converted into the pulse signal, thus permitting information on the speed of the engine to be acquired at all times.

Figure 10:
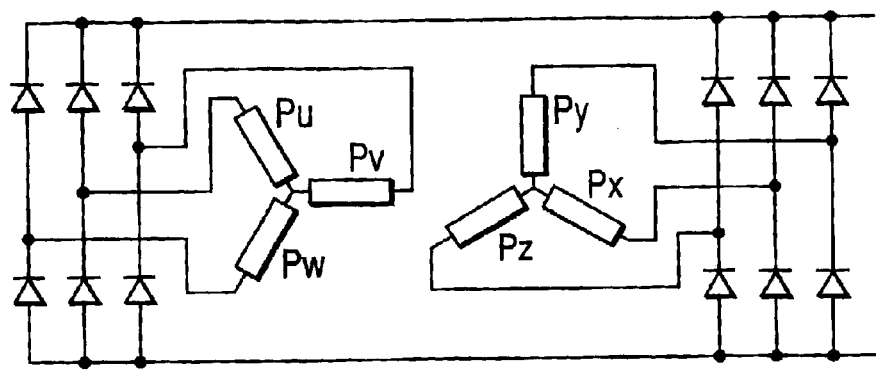
FIG. 10 is a circuit diagram which shows a part of an alternator equipped with two armature windings.

The speed signal may also be produced in the same manner as described above even if the alternator has, as shown in FIG. 10, two armature windings whose phase difference is 30° in electrical angle.

Figure 11:
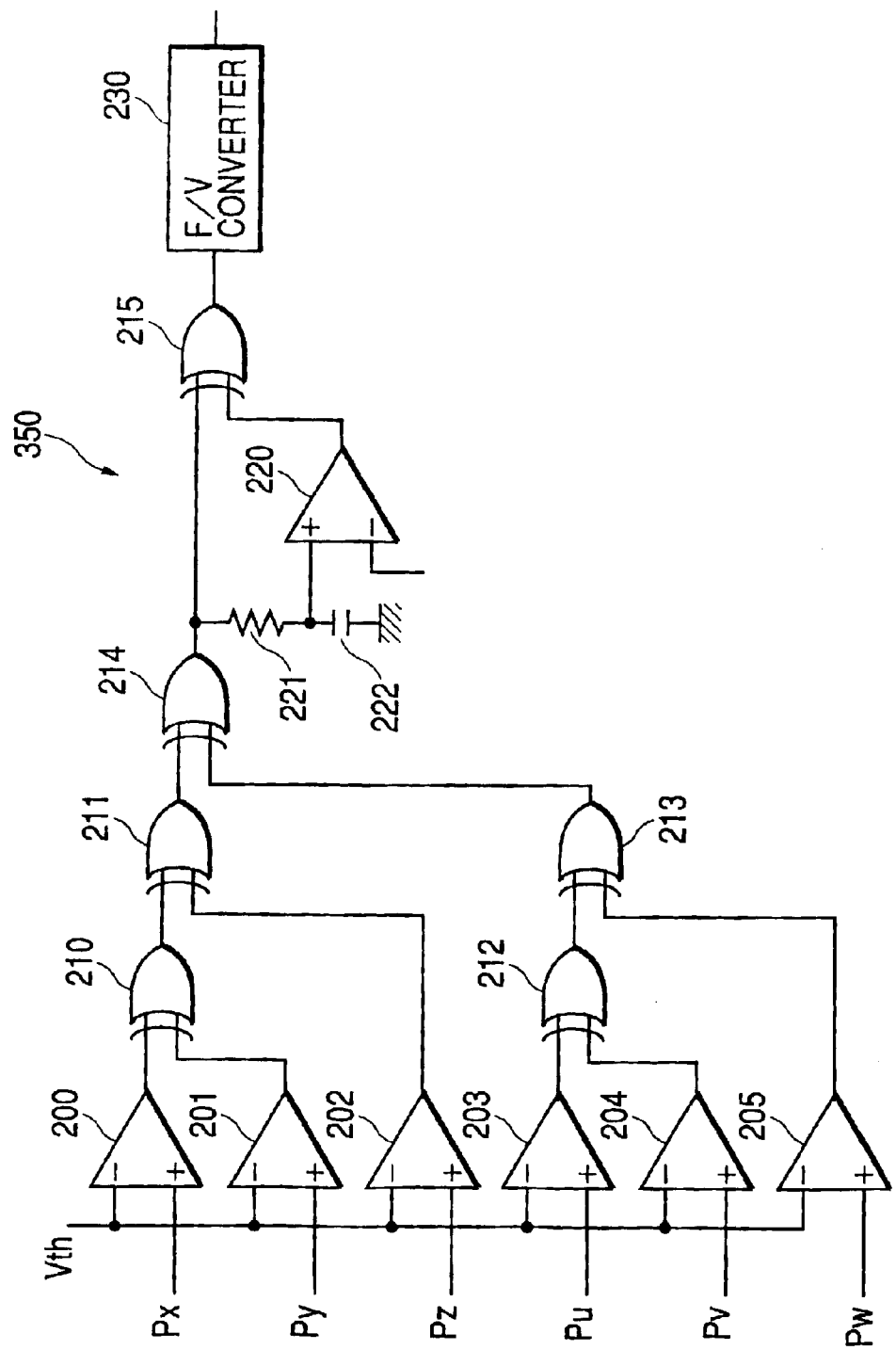
FIG. 11 is a block diagram which shows a speed determining circuit installed in the alternator shown in FIG. 10.

FIG. 11 shows a modification of the speed determining circuit 300 of FIG. 10 for use in the alternator, as illustrated in FIG. 10, having the two armature windings.

The speed determining circuit 350 includes voltage comparators 200, 201, 202, 203, 204, 205, and 220, exclusive OR circuits 210, 211, 212, 213, 214, and 215, a resistor 221, a capacitor 222, and an F/V converter 230.

The voltage comparators 200 to 205 work to convert the three-phase voltages Px, Py, and Pz of the first armature winding and three-phase voltages Pu, Pv, and Pw of the second armature winding into pulse signals, respectively. The pulse signals are processed through a CR circuit made up of the exclusive OR circuits 210 to 213, the resistor 221, and the capacitor 222, the voltage comparator 220, and the exclusive OR circuit 215 to produce a speed pulse signal which has a frequency of twelve times a power generating fundamental frequency. The speed pulse signal is converted by the F/V converter 230 into a voltage signal to produce a speed signal identical with the speed signal ω used in the above embodiments. Since the speed pulse signal outputted from the exclusive OR circuit 215 has the frequency of twelve times the power generating fundamental frequency, if the alternator has twelve poles, a $72^{th}$-order speed pulse signal is produced. If the alternator has sixteen poles, a $96^{th}$-order speed pulse signal.

Each of the controllers 6, 6A, and 6B in the above embodiments is made by a combination of digital and analog circuits, but however, may be constructed using a microcomputer to perform the inertia torque reducing control.

Figure 12:
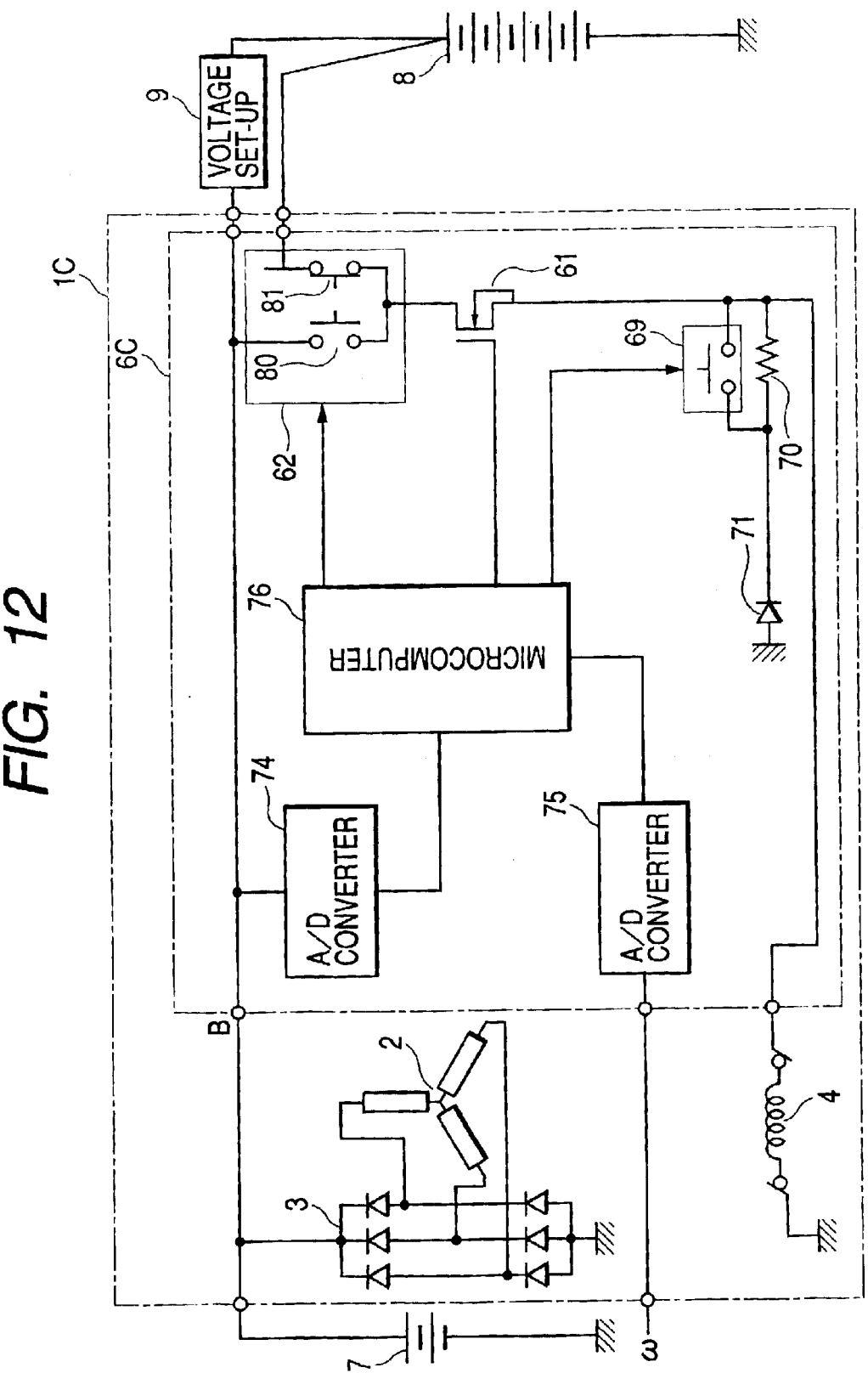
FIG. 12 is a block diagram which shows an automotive alternator designed to reduce an inertia torque of a rotor of the alternator under control of a microcomputer.

FIG. 12 shows an alternator 1C designed to perform the inertia torque control under control by a microcomputer.

The alternator 1C includes the armature winding 2, the rectifier 3, the field winding 4, and the controller 6C. The alternator IC is different from the alternator 1 of FIG. 1 only in structure of the controller 6C. Other arrangements are identical, and explanation thereof in detail will be omitted here.

The controller 6C consists of the power transistor 61, the relay 62, the short-circuiting relay 69, the resistor 70, the circulating diode 71, the A/D converters 74 and 75, and the microcomputer 76. The same reference numbers as employed in FIG. 1 refer to the same parts, and explanation thereof in detail will be omitted here.

The A/D converter 74 converts an output voltage of the rectifier 3 into a digital signal. A/D converter 75 converts the speed signal ω inputted in an analog form from outside the alternator 1C into a digital signal. The microcomputer 76 is made up of a CPU, a ROM, and a RAM and works to perform an inertia torque reducing control program, as shown in FIG. 13, stored in the ROM or RAM through the CPU.

Figure 13:
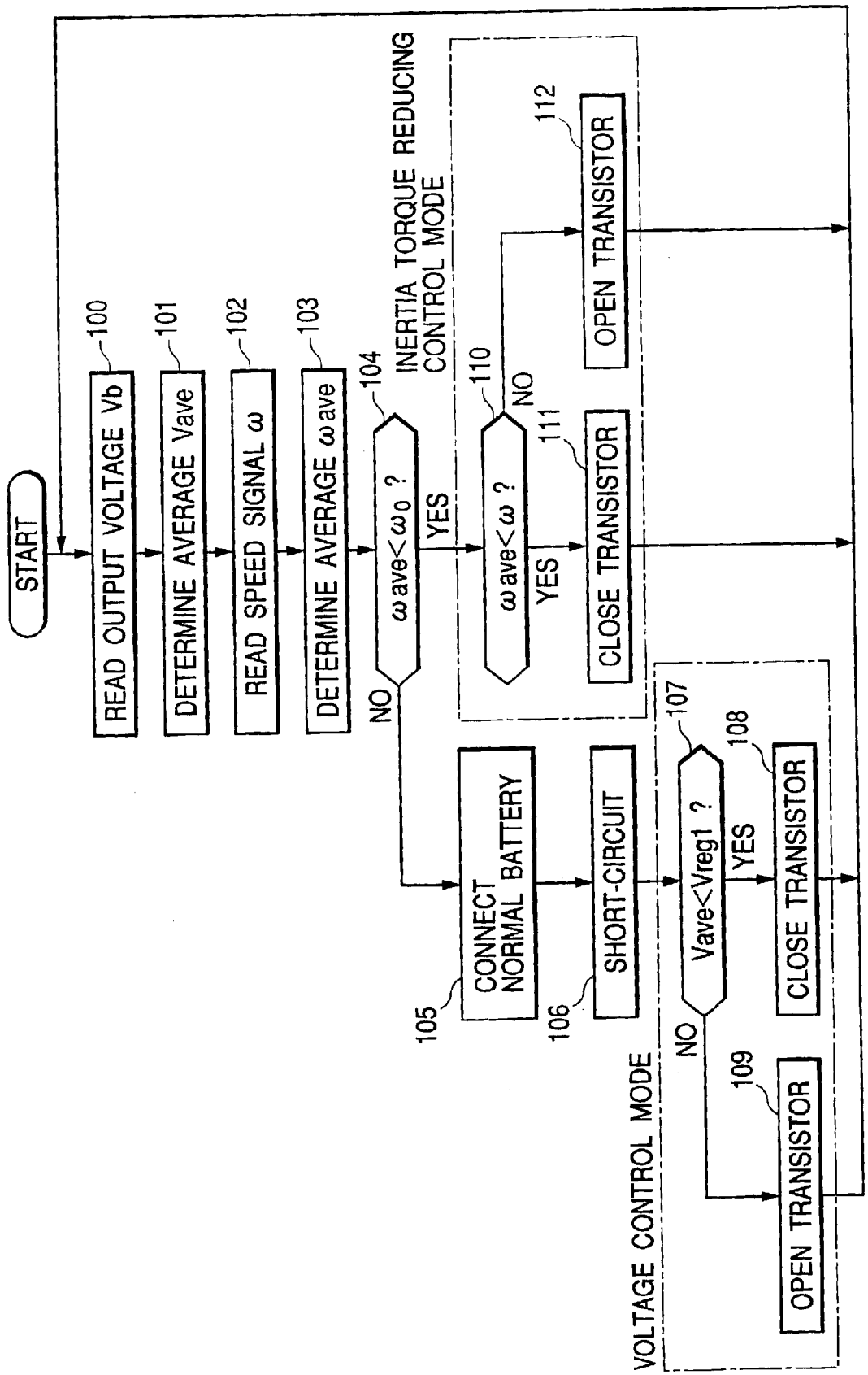
FIG. 13 is a flowchart of a control program performed by the alternator of FIG. 12.

After entering the program of FIG. 13, the routine proceeds to step 100 wherein the output voltage Vb of the A/D converter 74 is picked up. The routine proceeds to step 101 wherein the average value $V_{ave}$ of the output voltage Vb is calculated. The routine proceeds to step 103 wherein the speed signal ω outputted from the A/D converter 75 is picked up. The routine proceeds to step 103 wherein the average value $\omega_{ave}$ of speed of the engine using the speed signal ω is calculated.

The routine proceeds to step 104 wherein it is determined whether the average value $\omega_{ave}$ is lower than the speed reference value $\omega_0$ or not. If a NO answer is obtained meaning that the average value $\omega_{ave}$ is higher than the speed reference value $\omega_0$, then the routine proceed to step 105 wherein the relay 62 is controlled to select the normal voltage battery 7. The routine proceeds to step 106 wherein the short-circuiting relay 69 is activated to short-circuit the ends of the resistor 70. Subsequently, a normal voltage control mode is entered. Specifically, the routine proceeds to step 107 wherein it is determined whether the average value $\omega_{ave}$ is lower than the reference value Vreg1 or not. If a YES answer is obtained, then the routine proceeds to step 108 wherein the power transistor 61 is closed. Alternatively, if a NO answer is obtained, then the routine proceeds to step 109 wherein the power transistor 61 is opened.

If a YES answer is obtained in step 104 meaning that the average value $\omega_{ave}$ is higher than the speed reference value $\omega_0$, an inertia torque reducing control mode is entered. Specifically, the routine proceeds to step 110 wherein it is determined whether the average value $\omega_{ave}$ is lower than the speed signal ω indicative of an instantaneous value of the speed of the engine or not. If a YES answer is obtained, then the routine proceeds to step 111 wherein the power transistor 61 is closed. Alternatively, if a NO answer is obtained, then the routine proceeds to step 112 wherein the power transistor 61 is opened.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A control apparatus for an automotive alternator driven by an internal combustion engine installed in a vehicle, comprising:

an output voltage control circuit working to supply an exciting current to a rotor of the alternator so as to control an output voltage of the alternator; and an inertial torque reducing control circuit working to perform an inertia torque reducing control which controls the exciting current so as to produce a power generating torque at the rotor which serves to reduce a change in inertial torque of the rotor arising from a change in speed of the internal combustion engine.

2. A control apparatus as set forth in claim 1, wherein said inertia torque reducing control circuit includes a switch which works to control a supply of the exciting current to a fielding winding serving to magnetize field poles of the rotor, a speed determining circuit working to determine whether a speed of the internal combustion engine is lower than a first speed reference value, a first control circuit working to perform the inertia torque reducing control when it is determined that the speed of the internal combustion engine is lower than the first speed reference value, and a second control circuit working to perform an output voltage control which controls a switching operation of the switch based on the output voltage of the alternator when it is determined that the speed of the internal combustion engine is higher than the first speed reference value.

3. A control apparatus as set forth in claim 2, wherein said first control circuit closes said switch to supply the exciting current from a higher-voltage power supply designed to develop a voltage higher than a rated output voltage of the alternator when the speed of the engine exceeds a second speed reference value determined as a function of a change in speed of the engine, said first control circuit opens said switch to stop the supply of the exciting current and attenuates the exciting current flowing through said field winding using a circulating circuit line when the speed of the engine drops below the second speed reference value.

4. A control apparatus as set forth in claim 3, wherein said circulating circuit line has disposed therein a resistor which has a resistance value of at least ten times an electrical resistance of said field winding.

5. A control apparatus as set forth in claim 3, wherein said circulating circuit line has disposed therein a rectifying device which has a forward on-voltage that is higher than a rated output voltage of the alternator.

6. A control apparatus as set forth in claim 2, wherein the field winding of the alternator has a time constant below 10 msec and wherein said first control circuit supplies the exciting current from a voltage power supply designed to develop a voltage substantially the same as a rated output voltage of the alternator during a deceleration time when the speed of the engine decreases, said first control circuit opening the switch to stop the supply of the exciting current and attenuating the exciting current flowing through the field winding through a circulating circuit line during an acceleration time when the speed of the engine increases.

7. A control apparatus as set forth in claim 6, further comprising a speed change rate determining circuit which determines a change rate of the speed of the engine, and wherein said first control circuit works to change a duty cycle of a signal used to turn on and off said switch as a function of the change rate of the speed of the engine as determined by said speed change rate determining circuit during the deceleration time.

8. A control apparatus as set forth in claim 1, wherein the inertia torque reducing control is performed on the alternator which is driven mechanically by an output torque of the engine through a belt.

9. A control apparatus as set forth in claim 8, wherein the alternator is joined mechanically to the engine through a serpentine drive system which has a tensioner working to keep tension of the belt constant.

10. A control apparatus as set forth in claim 2, further comprising a speed determining circuit which works by the quantity of electricity as a function of frequency of a generated power of the alternator.

* * * * *